(12) United States Patent
Engle et al.

(10) Patent No.: US 7,590,883 B2
(45) Date of Patent: Sep. 15, 2009

(54) MANAGEMENT OF WARRANTY INFORMATION IN VITAL PRODUCT DATA FOR REPLACEABLE UNITS OF DATA HANDLING SYSTEMS

(75) Inventors: James Blaine Engle, Green Valley, AZ (US); Jason James Graves, Tucson, AZ (US); Shah Mohammad Rezaul Islam, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/670,610

(22) Filed: Feb. 2, 2007

(65) Prior Publication Data
US 2008/0189300 A1    Aug. 7, 2008

(51) Int. Cl.
*G06F 11/00* (2006.01)
(52) U.S. Cl. .......................................................... 714/7
(58) Field of Classification Search ............... 714/7–10, 714/15, 18, 20, 25, 31, 37, 39, 47
See application file for complete search history.

(56) References Cited

U.S. PATENT DOCUMENTS

| | | | |
|---|---|---|---|
| 6,282,670 B1 * | 8/2001 | Rezaul Islam et al. ......... | 714/6 |
| 6,598,174 B1 * | 7/2003 | Parks et al. .................... | 714/6 |
| 6,798,719 B1 | 9/2004 | Muta et al. ..................... | 368/29 |
| 6,873,958 B2 * | 3/2005 | Artinger ......................... | 705/4 |
| 6,892,159 B2 * | 5/2005 | Weiss et al. .................. | 702/130 |
| 7,073,050 B2 | 7/2006 | Chen et al. ..................... | 713/1 |
| 7,254,747 B2 * | 8/2007 | Osborn et al. ................. | 714/37 |
| 2003/0074230 A1 | 4/2003 | Merkin et al. .................. | 705/4 |
| 2003/0074294 A1 | 4/2003 | Merkin et al. ................. | 705/36 |
| 2004/0167832 A1 | 8/2004 | Wille .......................... | 705/28 |
| 2004/0205397 A1 * | 10/2004 | Rajiv et al. .................... | 714/25 |
| 2004/0205398 A1 * | 10/2004 | Osborn et al. ................. | 714/25 |
| 2006/0112073 A1 | 5/2006 | Jensen et al. .................. | 707/2 |
| 2006/0259374 A1 * | 11/2006 | Chen ............................ | 705/27 |
| 2007/0130029 A1 * | 6/2007 | Von Helmolt et al. ......... | 705/27 |

* cited by examiner

*Primary Examiner*—Nadeem Iqbal
(74) *Attorney, Agent, or Firm*—John H. Holcombe

(57) ABSTRACT

A vital product data system memory stores warranty information in vital product data relating to replaceable unit(s) of a data handling system. The data comprises a date of first use, and a device state field comprising an identifier representing one of the states: "new", "recertified", and, "in-use". Management control, in response to newly sensing a replaceable unit, detects its device state field, and if the detected field is set to the "new" state, resets it to the "in-use" state, sets the date of first use to a current date, and stores the state field and date of first use for the replaceable unit in the memory; and if the detected field is set to the "recertified" state, resets the field to the "in-use" state, and sets the replaceable unit date of first use to the date of first use stored in the memory for the previous replaceable unit at the same location.

16 Claims, 2 Drawing Sheets

MANAGEMENT OF WARRANTY INFORMATION IN VITAL PRODUCT DATA FOR REPLACEABLE UNITS OF DATA HANDLING SYSTEMS

FIELD OF THE INVENTION

This invention relates to vital product data of data handling systems, and, more particularly, to vital product data relating to replaceable units of the data handling systems.

BACKGROUND OF THE INVENTION

Many data handling products, such as data storage servers, etc., have multiple hardware units or components that are designed to be replaceable to reduce the total cost of ownership over time. The goal may be that if one of these replaceable units is or becomes defective, the unit or component that can replaced instead of an entire product replacement. A replaceable unit or "RU" (often called FRU—field replaceable unit, or CRU—customer replaceable unit) typically also comes with a warranty that guarantees the minimum lifespan of the unit. However, at times the replaceable unit does not last the full duration of its warranted lifespan. The vendor of the product may provide a replacement for the unit at no charge to the customer if it failed during the product warranty period. A complicating factor is when the product and replaceable unit have separate warranties and the warranty of the replaceable unit is based on first use. As the result, sometimes the customer may be unaware that a replaceable unit may be replaced at no cost, or sometimes the unit warranty may have expired and the expiration is unknown to the vendor so that the vendor replaces the unit at no charge.

SUMMARY OF THE INVENTION

Vital product data systems, data handling systems, methods, and computer program products manage vital product data with warranty information.

In one embodiment, in a data handling system capable of comprising at least one replaceable unit, a vital product data system comprises memory configured to store vital product data relating to the replaceable unit(s), the vital product data comprising at least a date of first use and a device state field, the device state field comprising an identifier representing one of the states: "new", "recertified", and "in-use"; and a management control. The management control is configured to, in response to newly sensing a replaceable unit, detect a device state field of the sensed replaceable unit, and if the detected replaceable unit device state field is set to the "new" state, reset the replaceable unit device state field to the "in-use" state, set the date of first use to a current date, and store the device state field and date of first use for the replaceable unit in the memory; and if the detected replaceable unit device state field is set to the "recertified" state, reset the replaceable unit device state field to the "in-use" state, and set the replaceable unit date of first use of the replaceable unit to the date of first use stored in the memory for the previous replaceable unit at the same location.

In a further embodiment, the management control is additionally configured to, if the detected replaceable unit device state field is set to the "in-use" state, copy the date of first use from the replaceable unit to the memory.

In another embodiment, the data handling system comprises a data storage system configured to employ a plurality of replaceable data storage units, and to employ a storage controller, and the vital product data system management control is additionally configured to indicate to the storage controller a newly sensed replaceable data storage unit, and indicate whether there are changes to the vital product data for the replaceable unit at the location of the newly sensed replaceable data storage unit.

In a still further embodiment, the management control is additionally configured to reinitialize the vital product data relating to replaceable units as stored in the memory, if the device state field of a replaceable unit is set to the "in-use" state, provide the device state field and copy the data of first use from the replaceable unit to the memory for the replaceable unit.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
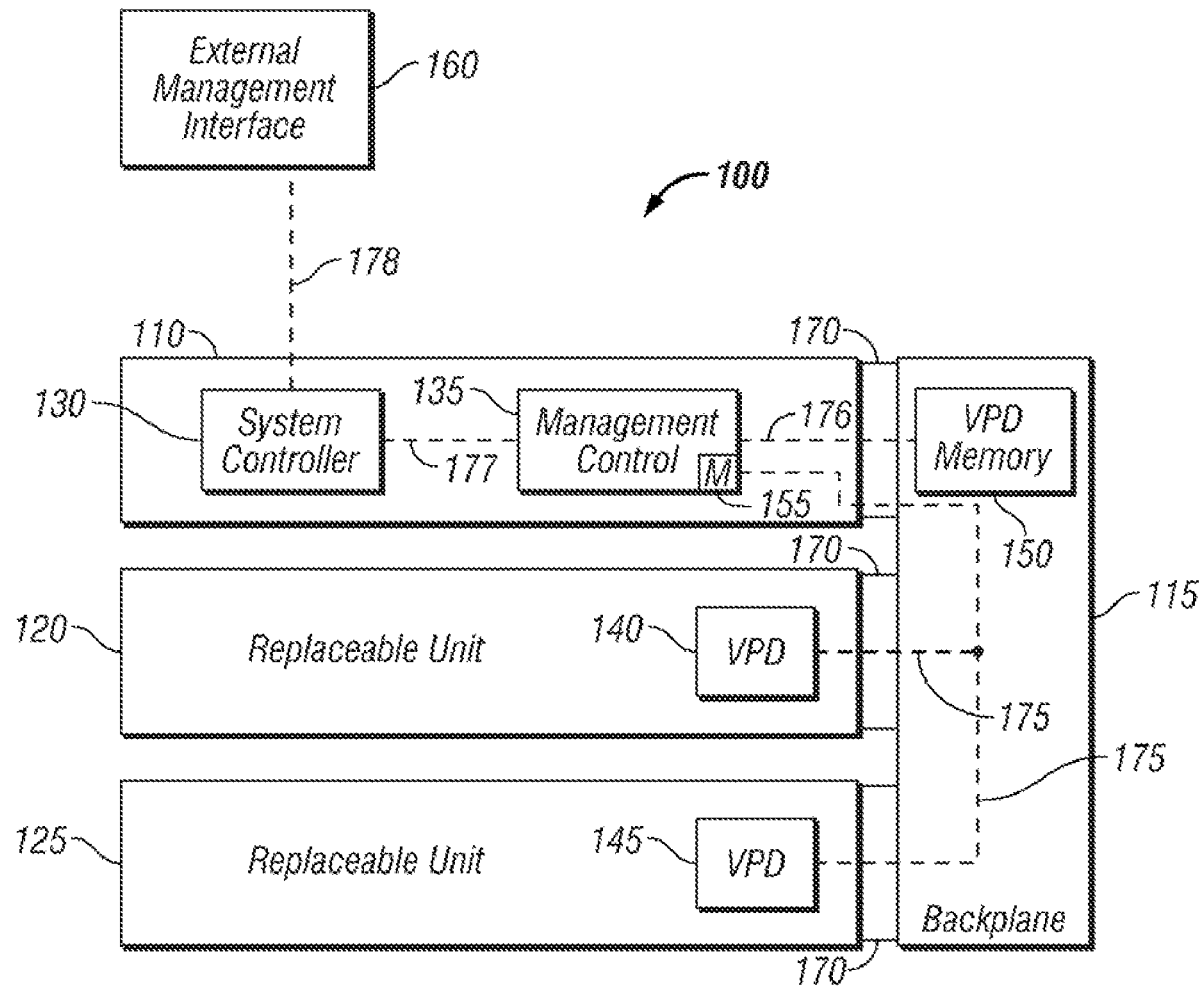
FIG. 1 is a diagrammatic illustration of an information handling system with a replaceable unit which may embody the present invention.

Referring to FIG. 1, an embodiment of a data handling system 100 comprises a baseboard control complex 110, a backplane 115, which may be replaceable, and replaceable units 120 and 125. Complex 110 may embody a system control 130 that operates the data handling system 100 and a management control 135 provides a management of the background functioning of the data handling system. An example of a data handling system comprises a data storage subsystem, such as a data storage blade. An example is the IBM® Blade Center.

Replaceable units 120 and 125 may be examples of many replaceable units of the data handling system. In the example of a data storage subsystem, the replaceable units may comprise drive trays, each with one or more data storage disk drives, and battery trays, each with batteries to protect data in cache in the absence of externally supplied power.

For identification purposes, the replaceable units have vital product data, for example stored in a non-volatile memory 140, 145 with information such as a Part Number that identifies the kind of part; a Serial Number that identifies the specific part; an identifier of the manufacturer; and the date of manufacture; all set up during manufacture of the replaceable unit. If the replaceable unit has a separate warranty, the vital product data may also provide the warranty lifetime; and, may provide a date of first use field, which is set to all zeros at manufacturing, or at recertification. In accordance with the present invention, a device state field is also provided. The device state field comprises an identifier representing one of the states: "new", "recertified", and, "in-use", and may comprise a numeric field describing the state of the device. In one example, the device state field identifier may comprise:

0="New"=unused state.

1="Recertified"=previously used, but recertified for use as a certified spare.

2="In-use"=used state, as in currently in use.

The backplane 115 may comprise a vital product data memory 150 and may itself be replaceable. In other embodiments, the vital product data memory 150 may reside in the baseboard control complex 110.

The baseboard control complex 110, a system controller 130, and management control 135 may comprise separate computer processors or may comprise applications operating on a single processor or processor system. The processor, processors or processor system comprises logic and/or one or more microprocessors with memory, such as memory 155 for storing information and program information for operating the microprocessor(s). Herein "processor" or "control" may comprise any suitable logic, programmable logic, microprocessor, and associated or internal memory for responding to program instructions, and the associated or internal memory may comprise fixed or rewritable memory or data storage devices. The program information may comprise a computer program product tangibly embodied on a computer useable medium, such as a host memory or a data storage drive or disk array, or a floppy or optical disk, or a cartridge, or other suitable medium, and be supplied to the subsystem controller 130 or memory 155 from the external interface 160, for example from or by a web user interface or other network connection, or by any other suitable means. As one example, the program information computer useable program code is configured to operate the management control computer processor 135.

The vital product data memory 150 may comprise nonvolatile data storage, such as a memory system having a battery backup that protects data even if power is lost, flash PROM, EEPROM, disk drive, or other suitable non-volatile memory. Similarly, the vital product data of the replaceable units 120, 125 may comprise non-volatile memory as discussed above.

The external management interface 160 may comprise an interface to an external host system, or to a local system such as a server control. The interface may provide logic for handling aspects of the data transfer with respect to the baseboard control complex 110. For example, the external management interface 160 may comprise one or more Fibre Channel ports, one or more FICON ports, one or more ESCON ports, one or more SCSI ports, or other suitable ports.

The replaceable units may comprise disk drives or disk drive systems. Alternatively, magnetic tape drives may substitute for one or more of the disk arrays. The disk arrays may utilize RAID (Redundant Array of Independent Disks) protocols, or may comprise JBOD (Just a Bunch of Disks) arrays.

The replaceable units and baseboard control complex 110 may be mounted on the backplane 115 and coupled to the backplane by connectors 170. Communication links 175, 176, 177, 178 between the various units and systems may comprise serial or parallel interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

Figure 2:
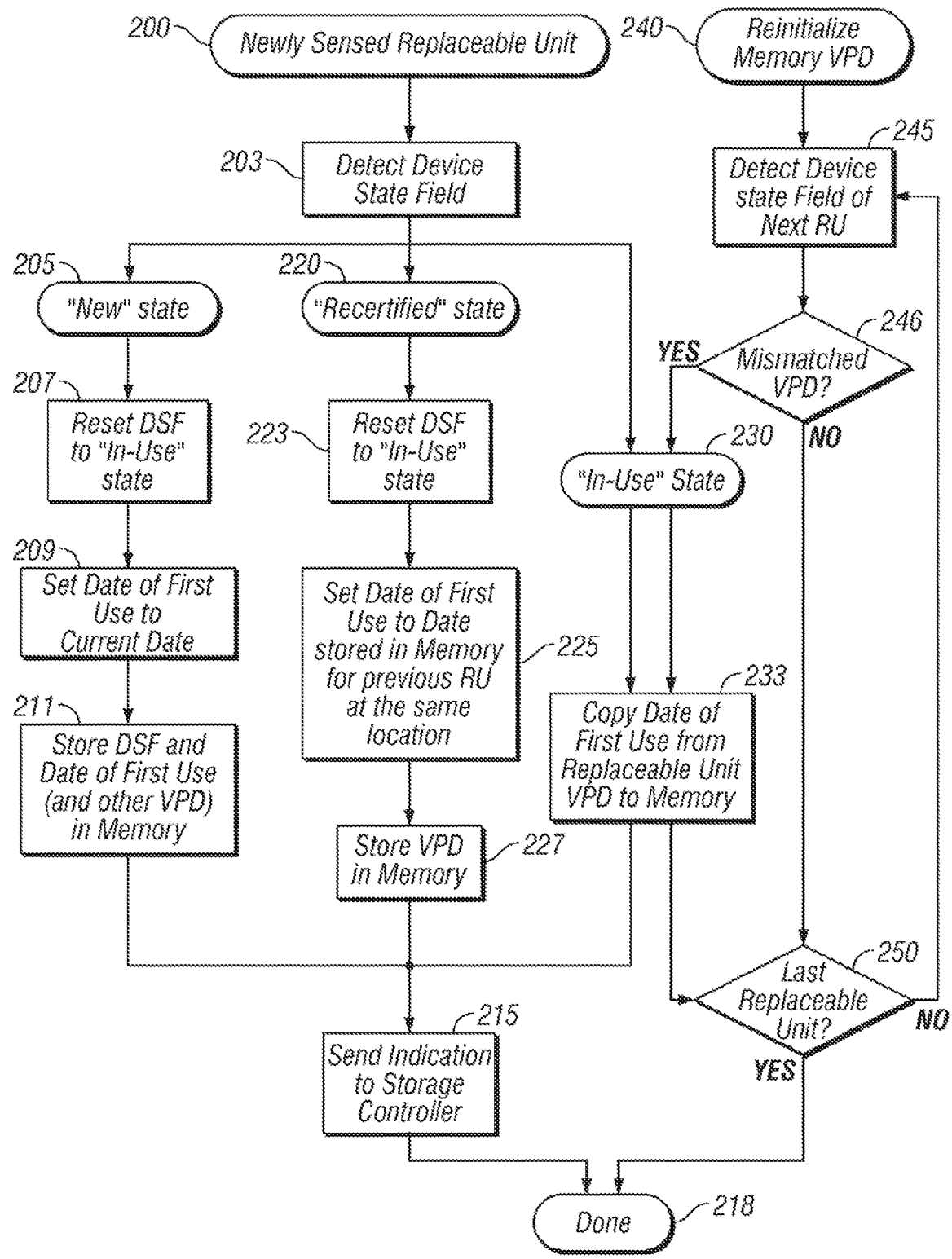
FIG. 2 is a depiction of a flow chart illustrating a method and computer program product employed with the information handling system of FIG. 1.

Referring to FIGS. 1 and 2, in one embodiment, in response to newly sensing a replaceable unit in step 200, for example, replaceable unit 120, the management control 135 is configured to, in step 203, detect a device state field of the vital product data 140 of the sensed replaceable unit. For example, the management control senses a replacement unit when that unit is plugged in to the connector 170, or when the system 100 is powered up after the replaceable unit has been installed.

In one example, the detected device state field is set to "new", which is "0" in the above example, and the date of first use is set, for example, equal to all zeros, both set by manufacturing. For example, this is the state of a new unit shipped with a new system 100, or is the state of a new unit as purchased by the customer with its own separate warranty.

If the detected replaceable unit device state field is set to the "new" state 205, the management control 135 resets the replaceable unit device state field to the "in-use" state, or "2", in step 207. In step 209, the management control sets the date of first use of the vital product data 140 to a current date, and, in step 211, stores the device state field and date of first use for the replaceable unit in the memory 150. This action starts the warranty running for the new device. In step 211, any other vital product data of the replaceable unit 120, may also be stored in memory 150.

The vital product data system management control is additionally configured to indicate to the system controller 130 in step 215 that a newly sensed replaceable data storage unit has been detected, and indicate whether there are changes to the vital product data for the replaceable unit at the location of the newly sensed replaceable unit. The system controller may request specific vital product data about that unit from memory 150, or the vital product data system of memory 150 or of the management control 135 may automatically have the information available and send it to the system controller 130. The process is completed, as indicated by step 218.

In another example, the detected device state field of the vital product data 140 for the unit 120 is set to "1" or "recertified" 220. For example, a replaceable unit has failed within a warranty period covering the device, and the supplier ships a certified spare unit to the customer. In this circumstance, the unit is only guaranteed for the remainder of the warranty of the part that has been replaced. The customer, for example, removes the failed unit and replaces the unit with the certified spare unit.

In accordance with the present invention, if the detected replaceable unit device state field 120 is set to the "recertified" state 220, the management control 135, in step 223, resets the replaceable unit device state field 140 to the "in-use" state, and, in step 224, sets the replaceable unit date of first use of the replaceable unit to the date of first use stored in the memory 150 for the previous replaceable unit at the same location. Thus, in one example, the management control determines the location of the replaced unit, checks the vital product data for the unit that was at that location, and uses the date of first use stored by the memory for that previous device to set the date of first use of the vital product data 140 of the unit 120.

In step 227, the management control stores the device state field and date of first use for the replaceable unit in the memory 150. Also in step 227, any other vital product data of the replaceable unit 120, may also be stored in memory 150.

The vital product data system management control is additionally configured to indicate to the system controller 130 in step 215 that a newly sensed replaceable data storage unit has been detected, and indicate whether there are changes to the vital product data for the replaceable unit at the location of the newly sensed replaceable unit. The system controller may request specific vital product data about that unit from memory 150, or the vital product data system of memory 150 or of the management control 135 may automatically have the information available and send it to the system controller 130. The process ends at step 218.

In a further embodiment, the management control may detect that the detected replaceable unit device state field is set to the "in-use" or "1" state 230. In one example, the customer may swap one replaceable unit with another, and the management control notices the newly sensed replaceable unit in step 200, and begins initialization. In step 233, the management control 135 copies the data of first use from the replaceable unit vital product data 140 to the memory 150. The management control may also copy other vital product data to the memory 150, and since the vital product data has been changed, in step 215, the vital product data system management control indicates to the system controller 130 that a newly sensed replaceable data storage unit has been detected, and that there are changes to the vital product data for the replaceable unit at the location of the newly sensed replaceable unit. The system controller may request specific vital product data about that unit from memory 150, or the vital product data system of memory 150 or of the management control 135 may automatically have the information available and send it to the system controller 130. The process ends at step 218.

In another embodiment, the data handling system 100 comprises a data storage system configured to employ a plurality of replaceable data storage units, and to employ a storage controller. The vital product data system management control is additionally configured to indicate to the storage controller a newly sensed replaceable data storage unit, and indicate whether there are changes to the vital product data for the replaceable unit at the location of the newly sensed replaceable data storage unit. In this manner, the storage controller may redefine the storage system to include the newly sensed replaceable data storage unit.

In a still further embodiment, the management control is additionally configured to reinitialize 240 the vital product data relating to replaceable units as stored in the memory 150. For example, the backplane 115 may be replaced, for example, by service personnel. The vital product data memory will have been initialized to all zeros before the installation. Thus, at reinitialization, in step 245, the management control 135 detects the device state field of the vital product data 140, 145 for a replaceable unit 120, 125, etc., and in step 246 detects that the vital product data date of first use for the unit is mismatched from the zeros of the memory 150. Since the device state field of the replaceable unit is set to the "in-use" state 230, the management control provides the device state field and copies the data of first use from the replaceable unit to the memory 150 for the replaceable unit in step 233.

In step 250, the management control determines whether all of the replaceable units have been checked. If not, the device state field of the next replaceable unit is checked in step 245. As one embodiment, each of the specific connections 175 is checked in a specified order. Alternatively, all connections are checked, and any connection with a mismatched vital product data (step 246) will be flagged and attended to in step 230, in a random or non-random basis. Upon reinitializing the vital product data for all of the replaceable units, step 250, the process is completed in step 218.

Steps 231, 230 and 233 are similar both for a replaced replaceable unit 200 and for a reinitialization 240, and, in one embodiment the same code may be employed, or in another embodiment separate code may be employed.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a data handling system capable of comprising at least one replaceable unit, a vital product data system comprising:
   memory configured to store vital product data relating to said at least one replaceable unit, said vital product data comprising at least a date of first use and a device state field, said device state field comprising an identifier representing one of the states: "new", "recertified", and, "in-use"; and
   a management control configured to, in response to newly sensing a replaceable unit, detect a device state field of said sensed replaceable unit, and
      if the detected replaceable unit device state field is set to said "new" state, reset said replaceable unit device state field to said "in-use" state, set the date of first use to a current date, and store said device state field and date of first use for said replaceable unit in said memory; and
      if the detected replaceable unit device state field is set to said "recertified" state, reset said replaceable unit device state field to said "in-use" state, and set the replaceable unit date of first use of said replaceable unit to the date of first use stored in said memory for the previous replaceable unit at the same location.

2. The vital product data system of claim 1, wherein said management control is additionally configured to, if the detected replaceable unit device state field is set to said "in-use" state, copy the date of first use from said replaceable unit to said memory.

3. The vital product data system of claim 2, wherein said data handling system comprises a data storage system configured to employ a plurality of replaceable data storage units, and to employ a storage controller, and wherein:
   said management control is additionally configured to indicate to said store controller a newly sensed replaceable data storage unit, and indicate whether there are changes to the vital product data for the replaceable unit at the location of said newly sensed replaceable data storage unit.

4. The vital product data system of claim 2, wherein said management control is additionally configured to reinitialize said vital product data relating to replaceable units as stored in said memory, if said device state field of a replaceable unit is set to said "in-use" state, provide said device state field and copy the data of first use from said replaceable unit to said memory for said replaceable unit.

5. A data handling system comprising:
   at least one frame configured to support at least one replaceable unit;
   memory configured to store vital product data relating to said at least one replaceable unit, said vital product data comprising at least a date of first use and a device state field, said device state field comprising an identifier representing one of the states: "new", "recertified", and, "in-use"; and a management control configured to, in response to newly sensing a replaceable unit, detect a device state field of said sensed replaceable unit, and if the detected replaceable unit device state field is set to said "new" state, reset said replaceable unit device state field to said "in-use" state, set the date of first use to a current date, and store said device state field and date of first use for said replaceable unit in said memory; and if the detected replaceable unit device state field is set to said "recertified" state, reset said replaceable unit device state field to said "in-use" state, and set the replaceable unit date of first use of said replaceable unit to the date of first use stored in said memory for the previous replaceable unit at the same location.

6. The data handling system of claim 5, wherein said management control is additionally configured to, if the detected replaceable unit device state field is set to said "in-us" state, copy the date of first use from said replaceable unit to said memory.

7. The data handling system of claim 6, comprising a data storage system configured to employ a plurality of replaceable data storage units, and to employ a storage controller, wherein:

said management control is additionally configured to indicate to said storage controller a newly sensed replaceable data storage unit, and indicate whether there are changes to the vital product data for the replaceable unit at the location of said newly sensed replaceable data storage unit.

8. The data handling system of claim 6, wherein said management control is additionally configured to reinitialize said vital product data relating to replaceable units as stored in said memory, if said device state field of a replaceable unit is set to said "in-use" state, provide said device state field and copy the data of first use from said replaceable unit to said memory for said replaceable unit.

9. A method for handling vital product data relating to at least one replaceable unit of a data handling system; said method comprising the steps of:

storing said vital product data relating to at least one replaceable unit of a data handling system, said vital product data comprising at least a date of first use and a device state field, said device state field comprising an identifier representing one of the states: "new", "recertified", and, "in-use";

in response to newly sensing a replaceable unit, detecting a device state field of said sensed replaceable unit, if the detected replaceable unit device state field is set to said "new" state, resetting said replaceable unit device state field to said "in-use" state, setting the date of first use to a current date, and storing for said data handling system, said device state field said date of first use for replaceable unit, and if the detected replaceable unit device state field is set to said "recertified" state, resetting said replaceable unit device state field to said "in-use" state, and setting the replaceable unit date of first use of said replaceable unit to the date of first use stored by said data handling system for the previous replaceable unit at the same location.

10. The method of claim 9, additionally comprising the step of:

if the detected replaceable unit device state field is set to said "in-use" state, copying the date of first use from said replaceable unit for said data handling system.

11. The method of claim 10, wherein said data handling system comprises a data storage system configured to employ a plurality of replaceable data storage units, and to employ a storage controller, additionally comprising the steps of:

indicating to said storage controller a newly sensed replaceable data storage unit; and indicating whether there are changes to the vital product data for the replaceable unit at the location of said newly sensed replaceable data storage unit.

12. The method of claim 10, comprising the step of:

reinitializing said vital product data relating to replaceable units as stored for said data handling system, if said device state field of a replaceable unit is set to said "in-use" state, providing said device state field and copying the data of first use from said replaceable unit for storage for said data handling system for said replaceable unit.

13. A computer program product comprising a computer useable medium having computer useable program code tangibly embodied therein for operating at least one computer processor for handling vital product data relating to at least one replaceable unit of a data handling system, said computer useable program code configured to, when executed on said at least one computer processor, cause said at least one computer processor to:

store said vital product data relating to at least one replaceable unit of a data handling system, said vital product data comprising at least a date of first use and a device state field, said device state field comprising an identifier representing one of the states: "new", "recertified", and, "in-use";

in response to newly sensing a replaceable unit, detect a device state field of said sensed replaceable unit, if the detected replaceable unit device state field is set to said "new" state, reset said replaceable unit device state field to said "in-use" state, set the date of first use to a current date, and store for said data handling system, said device state field and date of first use for said replaceable unit; and if the detected replaceable unit device state field is set to said "recertified" state, reset said replaceable unit device state field to said "in-use" state, and set the replaceable unit date of first use of said replaceable unit to the date of first use stored by aid data handling system for the previous replaceable unit at the same location.

14. The computer program product of claim 13, wherein said computer useable program code is additionally configured to, when executed on said at least one computer processor, cause said at least one computer processor to:

if the detected replaceable unit device state field is set to said "in-use" state, copy the date of first use from said replaceable unit for said data handling system.

15. The computer program product of claim 14, wherein said data handling system comprises a data storage system configured to employ a plurality of replaceable data storage units, and to employ a storage controller, and wherein said computer useable program code is additionally configured to, when executed on said at least one computer processor, cause said at least one computer processor to:

indicate to said storage controller a newly sensed replaceable data storage unit; and indicate whether there are changes to the vital product data for the replaceable unit at the location of said newly sensed replaceable data storage unit.

16. The computer program product of claim 14, wherein said computer useable program code is additionally configured to, when executed on said at least one computer processor, cause said at least one computer processor to:

reinitialize said vital product data relating to replaceable units as stored for said data handling system, if said device state field of a replaceable unit is set to said "in-use" state, provide said device state field and copy the data of first use from said replaceable unit for storage for said data handling system for said replaceable unit.

* * * * *